United States Patent
Himmler et al.

[11] 3,871,210
[45] Mar. 18, 1975

[54] VIBRATION TESTING APPARATUS WITH PRELOAD CONTROL

[75] Inventors: Gunther Himmler, Darmstadt; Klaus-Peter Ohms, Da-Eberstadt; Peter-Max Gruber, Pfungstadt, all of Germany

[73] Assignee: Gebr. Hofmann KG, Darmstadt, Germany

[22] Filed: Nov. 3, 1972

[21] Appl. No.: 303,390

[30] Foreign Application Priority Data
Nov. 12, 1971 Germany.............................. 2156369

[52] U.S. Cl. ........................................ 73/67, 73/146
[51] Int. Cl. .............................................. G01h 1/00
[58] Field of Search ............ 73/67, 67.1, 67.2, 67.3, 73/67.4, 146

[56] References Cited
UNITED STATES PATENTS
| | | | |
|---|---|---|---|
| 2,548,381 | 4/1951 | Lazan | 73/67.3 |
| 3,416,363 | 12/1968 | Siems | 73/67.1 |
| 3,604,249 | 9/1971 | Wilson | 73/67.2 |

FOREIGN PATENTS OR APPLICATIONS
| | | | |
|---|---|---|---|
| 250,535 | 10/1970 | U.S.S.R. | 73/146 |

*Primary Examiner*—Richard C. Queisser
*Assistant Examiner*—John P. Beauchamp
*Attorney, Agent, or Firm*—Cushman, Darby & Cushman

[57] ABSTRACT

An apparatus for carrying out structural tests on rotors such as tires having an oscillator for applying an exciting force, a preload control for applying a preload force, and at least one vibration sensing device. The oscillator is mounted for pivotal movement over preferably a 90° angular range and the exciting and preload forces are applied independently and separately.

7 Claims, 3 Drawing Figures

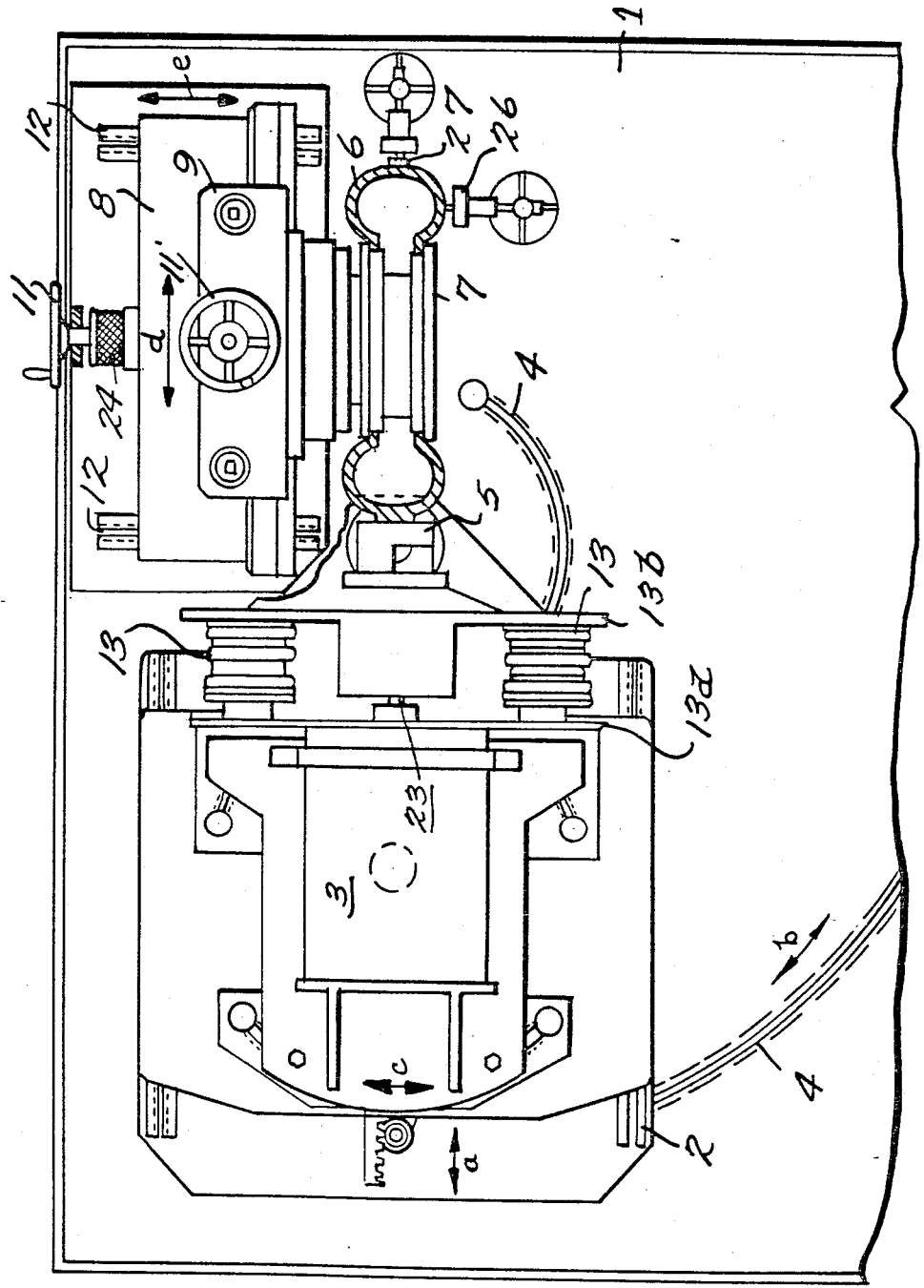

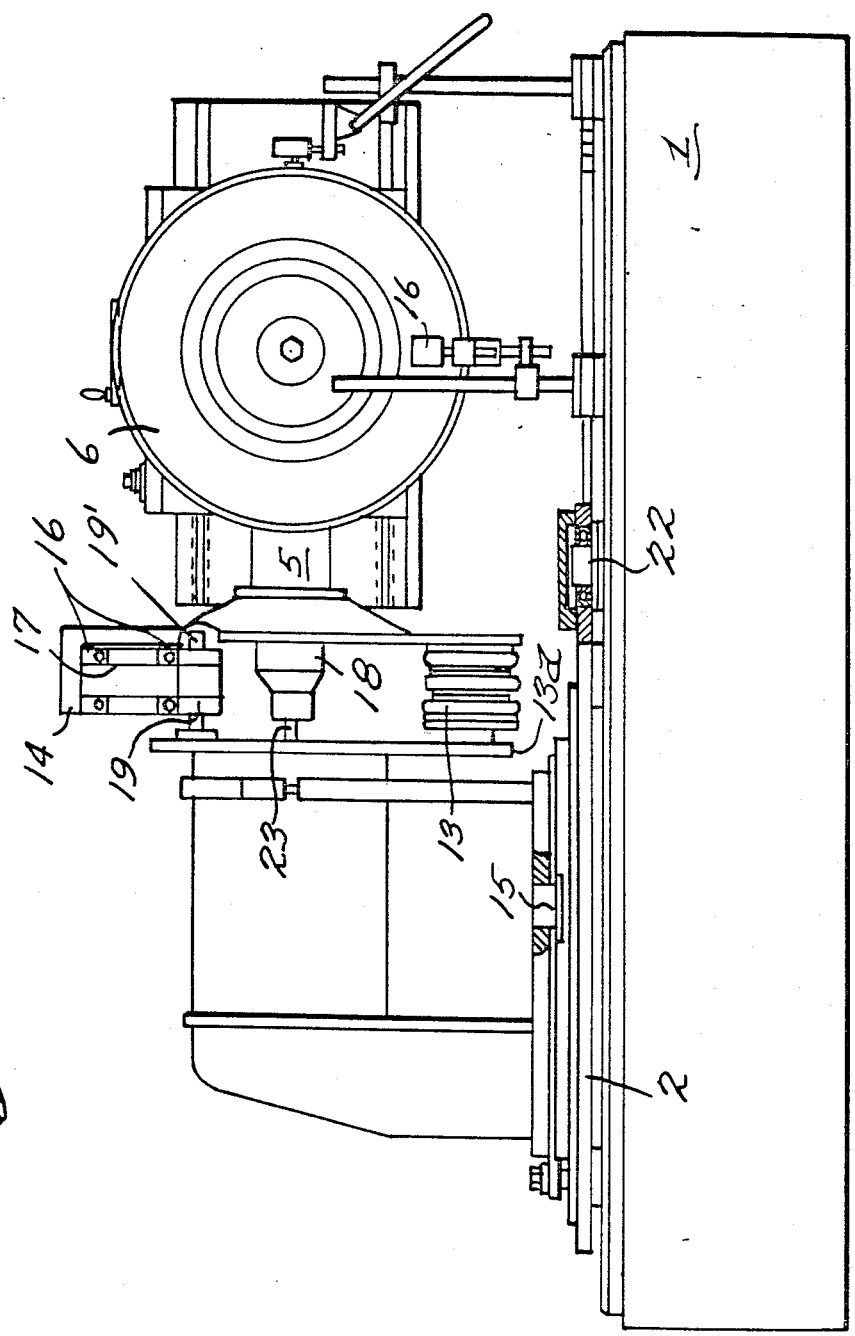

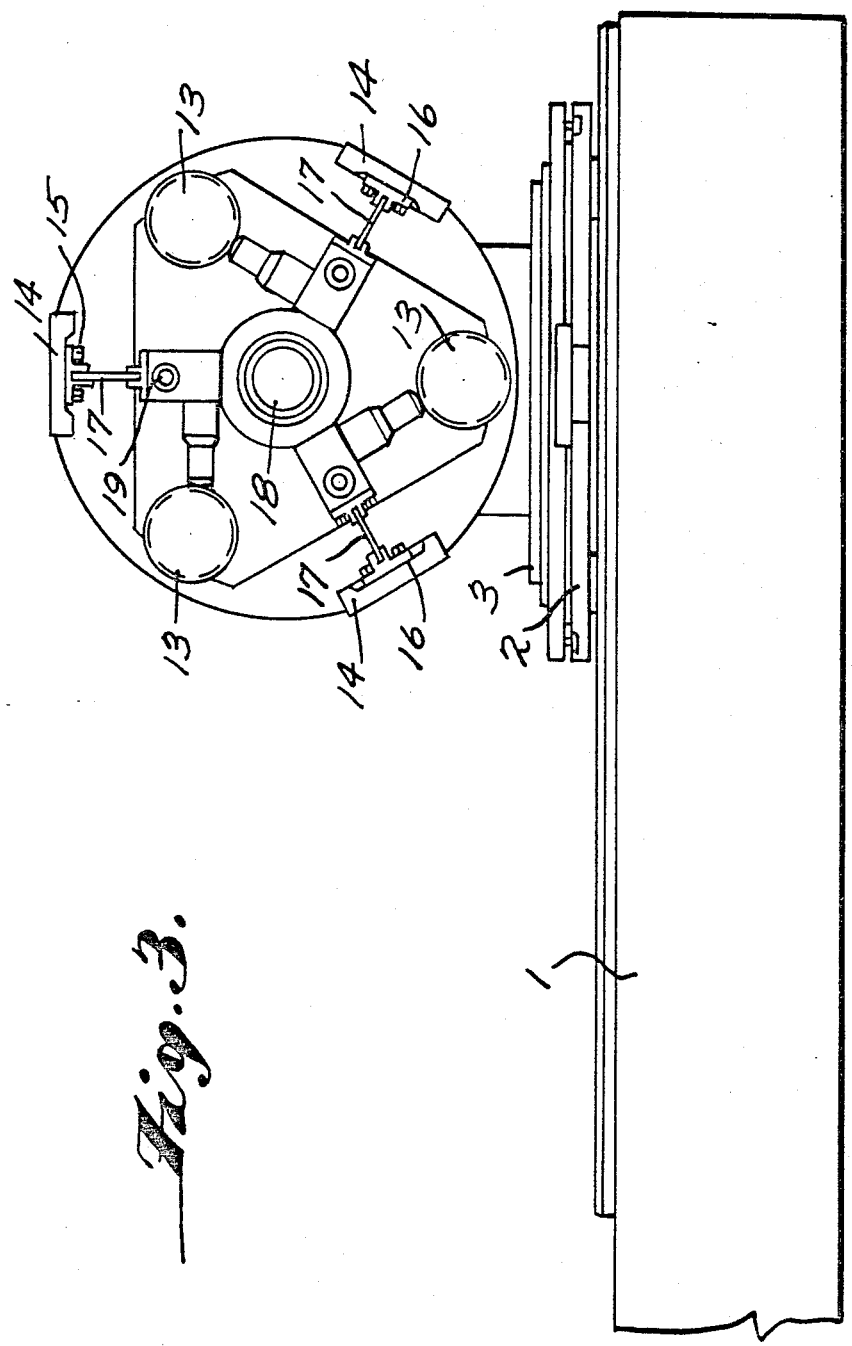

VIBRATION TESTING APPARATUS WITH PRELOAD CONTROL

The invention relates to an apparatus for carrying out structural tests of elastic and/or plasto-elastic bodies and more particularly tires, involving an oscillation mechanism and a preload control for determining the mode of oscillation of the body under the action of the oscillator and the preload control by means of at least one vibration pick-up.

It is known (for example, as discussed in F. Böhm "Mechanik des Gürtelreifens") to excite the tires of motor vehicles either radially or laterally by means of electrodynamic oscillators in order to record, with the aid of a vibration pick-up, the vibrational response of the tire produced thereby from which can be derived information on the structure of the tire. In order to excite the tire radially or laterally at various points, it has been necessary to index the tire manually and then to secure the measuring pick-up firmly to certain points of the tire which of course is very bothersome and time-consuming. There is a further disadvantage in that the measurements can only be made in radial or lateral directions.

To derive as complete information as possible about the performance of the tire, it is, however, desirable to determine and excite every point of the tire, if possible, and to measure the reaction to the excitation at any point by means of pick-ups. This object, however, can only be achieved in part by the known method.

Another disadvantage of the known method is the fact that the influence of radial and lateral preload forces on the specific performance of the tire cannot be simulated. It is further disadvantageous in that the preload corresponding to the weight of the vehicle acting on the tire can only be generated by the spring system of the oscillator. When the preload is not measured, there is the risk that the oscillating force may exceed the preload. This, however, means that the excitation acting on the tire will not be sinusoidal but contain harmonics with the result that testing conditions are not accurately maintained.

Based on the aforementioned state of the art, it is the object of this invention to eliminate the above-indicated disadvantages and to propose an improved apparatus for carrying out structural tests. This task is solved according to the invention in that the oscillator, with regard to its direction of oscillation, can in particular be swivelled and adjusted to be infinitely variable within a certain angle of 90° particularly, in relation to the body under test, and in that its oscillating force is adjustable irrespective of the set force of the preload. According to the invention it is, therefore, possible to excite and examine a rotor to be tested not just only radially and laterally but also at any point within a given sector, 90° in particular.

As according to the invention the oscillator and the preload control are set and operate independently of each other with their respective values being measured and displayed on separate dials. Thus, it is possible to alter the forces over a wide range without interference with each other.

It is expedient that the preload control together with the oscillator be swivelled within the angular range in relation to the workpiece to be tested so that the preload also may not only be applied radially or laterally against any point. In spite of this coordinated swivel motion, however, the oscillator and the preload control operate independently of each other, and in this way the oscillator, which may be of a conventional electrodynamic type, is not affected by the preload which can lead to incorrect test results since no true sinusoidal vibrations are obtained with a preload acting on an electro-dynamic oscillator.

According to a preferred embodiment, a second preload control is provided which does not act in direction of oscillation or acts in that direction, however with one component only. This offers the advantage that a radial and lateral preload may simultaneously attack the tire and similar bodies in order to simulate cornering forces when a tire test, for instance, is made.

It is advantageous if the self-aligning forces of the rotor to be tested which are not acting in the direction of oscillation are withheld from the rotor to be tested by means of a direction-selective suspension of the oscillation system, so that the oscillator vibrations will be purely sinusoidal without any distortions. Furthermore, the oscillator will not be unduly loaded by transverse forces or moments.

The preload amount can, for instance, be measured by means of force elements such as piezoelectric elements which may be installed in an exciter head. The measuring pick-up may be so arranged that the whole test body surface can be scanned consecutively or continuously. With the use of the measuring pick-up or possibly several ones, the amount and direction of the vibrations of the test body can be ascertained in order to show, for instance, the specific shape and natural frequencies of the rotor under test. Adjustment of the measuring pick-ups may be either by hand or motor.

Further details of the invention will appear from the following description of an embodiment and from the drawings in which:

FIG. 1 is a plan view of an embodiment showing only the parts which are significant with respect to the invention;

FIG. 2 is an end view of the apparatus shown in FIG. 1;

FIG. 3 is a front view of the vibration oscillating system of the apparatus shown in FIGS. 1 and 2.

On a base 1 formed as a box is mounted a carriage-like structure defining rectilinear movement for a conventional oscillator 3 which is only diagrammatically illustrated. The oscillator 3 which can be, for instance, of the conventional electro-dynamic type, can be displaced in direction of an arrow $a$ in FIG. 1. In addition to this rectilinear movement, oscillator 3, together with displacement means 2, can be swivelled around a pivot bearing 22 shown in FIG. 2 over a circular path $b$. For this purpose, two concentric grooves 4 are provided which are adapted as circular sectors with bearing 2 as center. This swivel path is illustrated by an arrow $b$ in FIG. 1, and the angle of traverse is preferably 90°.

Apart from the above-mentioned swivelling motion along the grooves 4, the oscillator 3 is further pivotable around a pin 15 in the direction indicated by arrow $c$. This pivotable arrangement is provided in order that an exciter head 5 may be set in relation to a test body 6, which may be, for instance, a tire so that the excitation occurs perpendicularly to the surface and/or the tread of the tire. Swivelling in direction of arrow $b$, however, serves the purpose of exciting various points on the tire surface from purely radial to purely lateral direction. Within this range any points can be infinitely variably excited. The rectilinear displacement in direction of arrow a, however, serves for adjustment to different tire diameters.

In the exciter head 5 a load cell is incorporated to measure and control the exciting force and the preload as described more fully hereinafter. The body 6 to be measured, in this example a tire, is mounted on an adaptor 7, shown in FIG. 1, and so arranged that it may be turned, if required, about its axis of rotation in order to examine various points in circumferential direction so as to allow testing of any point of the tire. By means of two carriages 8 and 9, adaptor 7 is slidable in two directions perpendicular to each other as indicated by the arrows d and e in FIG. 1. The rectilinear displacement in the direction of arrow d is parallel to the rectilinear displacement in direction of arrow a and serves also for adjustment to different diameters.

The rectilinear displacement in the direction of arrow e which is perpendicular to the displacement d serves for the generation of a lateral preload which is produced by the frictional engagement of the tire tread and the adjacent contact surface of the exciter head 5.

For movement in direction of arrow e, diagrammatically illustrated guideways 12 are provided whereas the respective guideways for the direction of arrow d are not shown. Displacement in the direction of arrow e is effected by means of a handwheel 11 and by handwheel 11' in the other direction.

The amount of the lateral preload exerted by the displacement in the direction of arrow e is measured by means of a conventional pressure gauge 24. Based on the position of oscillator 3 as shown in FIG. 1, this lateral preload acts perpendicularly to the direction of excitation and does, therefore, not act in the direction of excitation. When the oscillator 3 is swivelled, a certain component of the lateral preload will act in the direction of excitation.

For providing a preload acting in the direction of excitation, three air-operated springs 13 are provided which are arranged as shown, more particularly in FIG. 3. The air-operated springs 13 are supported by two plates 13a and 13b opposite to each other. Exciter head 5 is fixed to plate 13b and is, therefore, pressed under a certain preload against the tire and/or its tread. The preload control acting in the direction of excitation is suspended direction-selectively and separately from the oscillator 3. For the direction-selective suspension, three parallel lever guides 14 are provided each comprising four cross spring joints 16 and two connecting rods 17 thus assuring a precise and almost frictionless rectilinear guidance of the exciter head 5. Describing this structure in detail, the parallel lever guides 14 fixed to plate 13b are fastened to a sleeve 19 through cross spring joints 16 and connecting rods 17, sleeve 19 being in engagement with and axially traversable on a guide axis 19'. Axis 19' is fixed to plate 13a. The axially traversable sleeve 19 can be locked on the axis 19' by means of the air-operated springs 13 after the application of preload.

To the oscillator 3 a rod 23 is firmly secured which can be axially displaced within a sleeve 18 when the machine is stopped. When it is started and after applying the preload, however, the rod 23 is firmly secured to the sleeve 18 so that the exciting force of the oscillator 3 will be transmitted to the exciter head 5, since the sleeve 18 is fixed to plate 13b.

When a certain radial preload has been generated by means of the air-operated springs 13 and applied to the exciter head 5, the sleeves 19 will be displaced on their coordinated axes while the parallel lever like connecting rods 17 remain in their vertical position. After application of the radial preload, sleeves 19 and their axes as well as rod 23 and sleeve 18 are then firmly secured to each other, thus allowing transmission of the exciting force from oscillator 3 to exciter head 5 and, consequently, also to the tire. Therefore, the preload and the exciting force are generated independently of each other. Moreover, the sensitive oscillator 3 will not be exposed to the action of the preload which may be considerable. For this reason there is, according to the invention, no limitation to the amount of preload and the preload forces applied can be relatively high. Under operating conditions, as is evident, the parallel lever like connecting rod 17 may be slightly swivelled under the action of the exciting force.

The radial preload is preferably applied to the body under test by means of an air-operated spring of extremely low rigidity so that possible reactions on the body under test are of no importance.

For detecting the oscillatory behaviour of the rotor 6 to be tested, two pick-ups 27 and 26 are provided which are so adapted and arranged that they measure the vibrations of the tire which permits to determine most easily the specific shape of the tire and its natural frequency as well as its general oscillatory behaviour. There are no limitations to the configuration of bodies which can be examined according to the invention. The invention is, however, preferably used for rotating bodies, and more particularly tires.

The following factors are of prime importance:

The exciting force is applied to the rotor under test separately from the preload, which means that the sensitive oscillator is not influenced by the force of the preload which is often considerable.

The oscillator together with the preload force acting in the same direction is steplessly orientable and adjustable within a certain angular range so that random points of rotating bodies may be scanned and excited in a purely radial to purely lateral direction. In addition to the possibility to turn around its axis of rotation, the rotor to be tested is, therefore, arranged fixed.

Additionally to the preload force and the exciting force which have the same positive direction, a second preload force perpendicular to said direction can be generated allowing the simulation of cornering forces and the like. Due to the fact that there is an additional possibility of swivelling the oscillator, it is always assured that the exciting force is applied perpendicularly to the surface of the rotor to be tested, the size of which may vary within a relatively wide range, since apart from that also linear displacement is possible.

Many changes and modifications in the above-described embodiment of the invention are possible.

What is claimed is:

1. In an apparatus for carrying out structural tests of rotors having an oscillator having a coordinated exciter head, a preload control means for setting a preload force, and means for detecting the response of a rotor to said oscillation of the body to be tested under the action of the oscillator and the preload force including at least one vibration pick-up, the improvement comprising means for mounting said oscillator in regard of its direction of oscillation for pivotal movement over a certain angular range of 90° particularly, in relation to the body under test, and means for applying the exciting force by said oscillator independently of and separately from the force applied by said preload control means and means for swivelling said preload control means together with the oscillator and said coordinated exciter head for exciting the rotor.

2. Apparatus as in claim 1, wherein for the generation of the preload force a plurality of air-operated springs are provided equidistantly from said exciter head and arranged between said oscillator and said coordinated exciter head in order to press the exciter head with a certain preload force against the rotor to be tested.

3. Apparatus as claimed in claim 2, wherein said exciter head is mounted on a plurality of the air-operated springs and a plurality of parallel lever guides arranged equidistantly and detachably connected with said oscillator for rectilinearly displacing said springs.

4. Apparatus as claimed in claim 1 including a second preload control means for producing a second preload control acting with at most one component.

5. Apparatus as claimed in claim 1 further including means for pivoting said oscillator, said exciter head, and the first of said preload control means about a further axis.

6. Apparatus as claimed in claim 1 further including means for displacing said oscillator, said exciter head, the first of said preload control means and/or the rotor to be tested rectilinearly for adjustment to different rotor diameters.

7. Apparatus as claimed in claim 4 including means for permitting the preload force generated by the first and second preload control to be set to a certain constant value, measured, and controlled.

* * * * *